Nov. 23, 1926. 1,607,686
C. P. NELSON
REMOTE INDICATING MEANS FOR LIQUID LEVEL GAUGES
Filed August 10, 1921    2 Sheets-Sheet 1
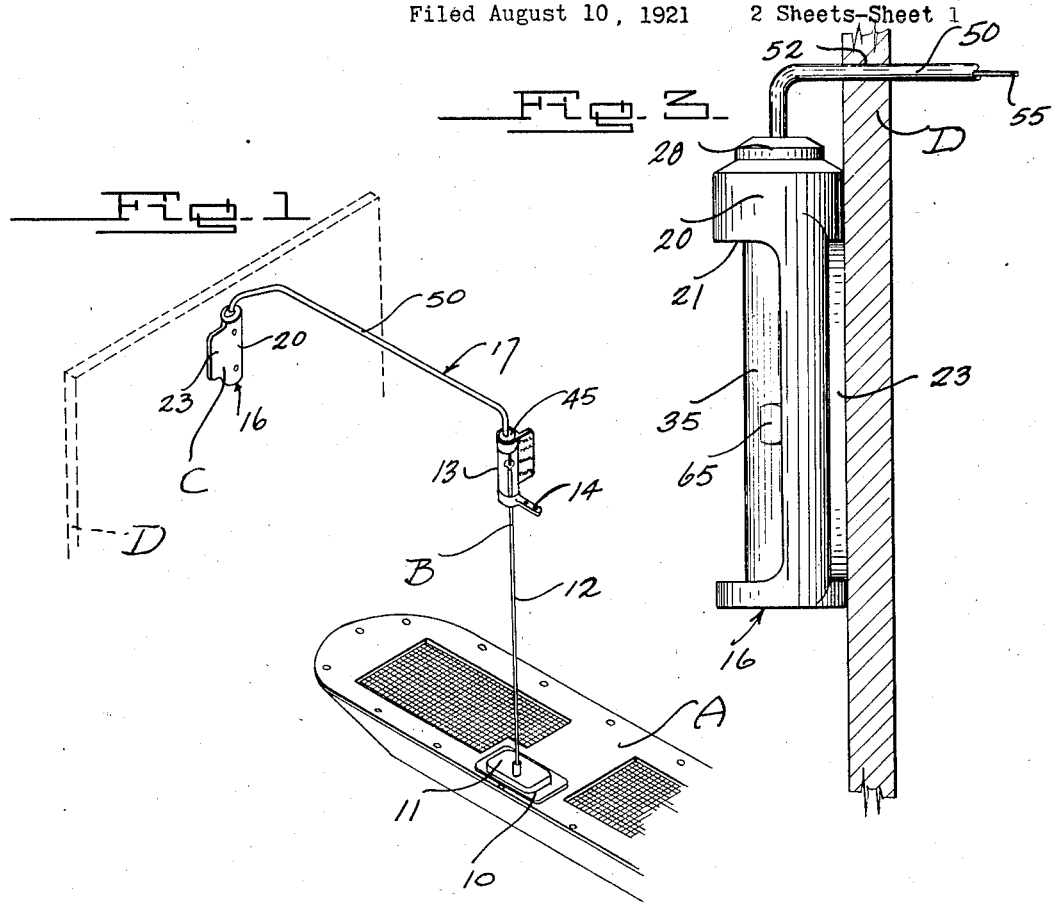
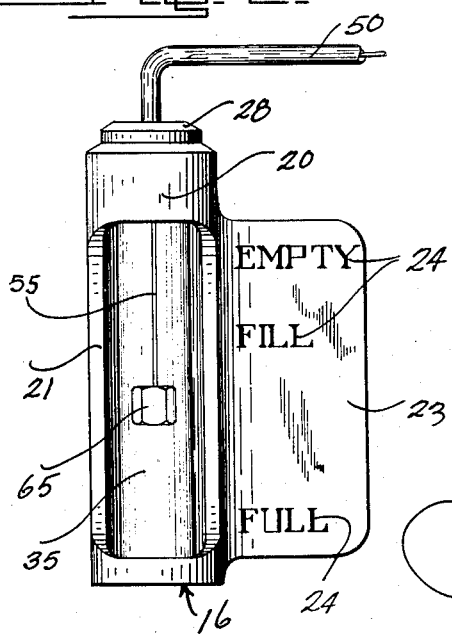
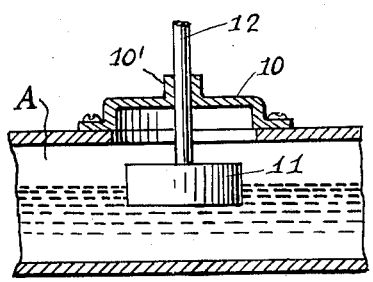
Inventor
Charles P. Nelson Nov. 23, 1926.
C. P. NELSON
1,607,686
REMOTE INDICATING MEANS FOR LIQUID LEVEL GAUGES
Filed August 10, 1921   2 Sheets-Sheet 2
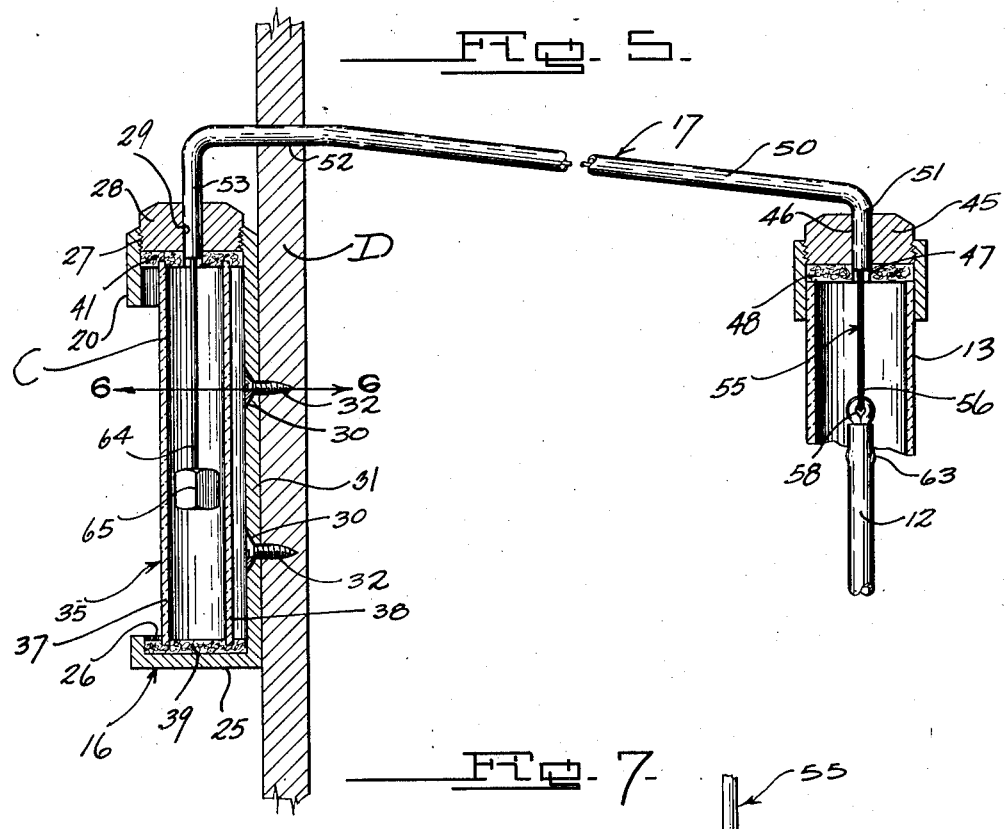
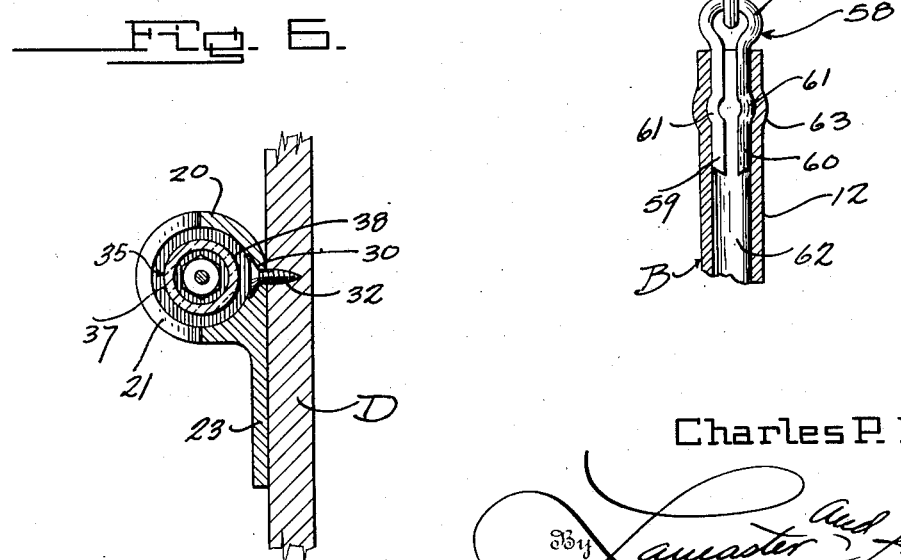
Inventor
Charles P. Nelson Patented Nov. 23, 1926.

1,607,686

UNITED STATES PATENT OFFICE.

CHARLES P. NELSON, OF SANTA MONICA, CALIFORNIA.

REMOTE INDICATING MEANS FOR LIQUID-LEVEL GAUGES.

Application filed August 10, 1921. Serial No. 491,256.

This invention relates to improvements in liquid level indicators.

The primary object of the invention is the provision of an auxiliary liquid level indicating device for use in connection with a conventional construction of liquid level gauge such as is now in use in connection with the motor of "Cadillac" cars.

A further object of the invention is the provision of an auxiliary indicator adapted for positioning on a vehicle instrument board or dash, and including a novel connection between the auxiliary indicator and conventional gauge so that the auxiliary indicator will be moved for indicating rise and fall of oil within the vehicle motor as the conventional gauge moves.

Other objects and advantages will be apparent during the course of the following detailed description.

In the accompanying drawings, forming a part of this specification, and in which similar reference characters designate corresponding parts throughout the several views, Figure 1 is a perspective view of the improved gauge, showing the same attached to the standard oil float mechanism of a "Cadillac" motor.

Figure 2 is a front elevation of the improved indicating gauge.

Figure 3 is a side elevation of details shown in Figure 2, showing the gauge connected to an instrument board or vehicle dash.

Figure 4 is a fragmentary sectional view through the oil pan of the motor and showing the float in place.

Figure 5 is a sectional fragmentary view, showing the details of the improved gauge and the connecting mechanism of the same with respect to a standard float device.

Figure 6 is a cross sectional view taken on the line 6—6 of Figure 5.

Figure 7 is a sectional view showing the gauge connection with a float mechanism.

In the drawings, wherein for the purpose of illustration is shown the preferred embodiment of my improved oil gauge, the letter A designates an oil reservoir, such as is found upon "Cadillac" motors, and having the standard float operated indicating mechanism B mounted thereon. The novel and improved gauge C is preferably adapted for use upon a dash or instrument board D.

The oil pan or reservoir A is provided with an opening closed by a cover 10 provided with a neck 10' for slidably receiving the hollow stem 12 of the float 11, resting upon the oil in the reservoir A. The hollow stem 12 which moves vertically with the float 11 extends upwardly for projection into a portion of the standard indicating means 13, which is provided as part of the means B. In "Cadillac" cars this casing 13 is part of the standard equipment and is detachably mounted by a lug 14 to a portion of the motor.

The improved liquid gauge C preferably includes that portion 16 detachably mounted upon the instrument board or dash D, and the connecting means 17 for operably connecting the portion 16 with the standard indicating device B. The portion 16 includes a metallic casing 20 having the forward portion thereof removed to provide the open face or slot 21, therein. A fin 23 adapted for containing indicia 24 is provided tangentially extending integral from the casing 20. A bottom 25 of casing 20 is provided with a pocket 26 interiorly of the casing, for a purpose to be subsequently set forth. The upper end of casing 20 is open and provided with the internal screw threads 27 for detachably receiving a cap 28 having an axial bore 29 extending therethrough. Countersunk apertures 30 are provided through the rear wall 31 of the casing 20 and diametrically opposite the open slot 21. These openings 30 are for the reception of countersunk head screws 32, whereby the casing 20 may be detachably supported upon the instrument board or dash D.

A cylindrical casing 35, of less diameter than the internal diameter of the metal casing 20, and open at both ends, is disposed within the metallic casing 20. The portion 37 nearest the operator's compartment of the car is transparent for visibility of the interior of the casing 35. On the other hand, the remaining or rear portion 38 is frosted, to make the same opaque, and for a purpose to be subsequently set forth.

In assembling the tube 35 within the outer casing 20, a yieldable pad 39 of fiber or rubber, having a circumferential groove therein, is disposed in the pocket 26, upon which the lower end of the casing 35 rests in the groove thereof, and is spaced from the inside walls or surfaces of the outer metallic casing 20. A yieldable washer 41, similar to the washer 39 is also provided in the upper portion of the casing 35, and is provided with an axial aperture therein. The cap 28 is adapted for rotation in the top of the metallic casing 20 engaging the screw threads 27 therein for clamping upon the washer 41, to securely position the inner casing 35 in fixed relation in the outer casing 20. When so arranged, the opaque rear surface 38 of the inner casing 37 conceals the connecting screws 32. When the outer casing 20 is attached to the dash or vehicle board D, the fin 23 will of course lie flush and abutting the outer surface of the instrument board, stabilizing the position of the mechanism 16 thereon.

In use, with the standard mechanism B of "Cadillac" motors, a special cap 45 is provided, for use in the supporting casing 13, said cap having an axial aperture 46 therein adapted for aligning with an axial aperture 47 in a flexible pad 48, which rests upon the casing 13. Brass or copper tubing 50, relatively small in diameter, is provided as a guide means, and has an end 51, fitting in the axial aperture 46 in the cap 45; the tubing 50 extending forwardly through an aperture 52, in the dash D, and being bent downwardly to provide a portion 53 for engagement in the axial aperture or bore 29 of the attaching cap 28. A flexible connecting cable 55 is provided for free reciprocation within the tubing 50, extending through the bore thereof, and having an end 56 thereof inserted through an eye 57 of an expanding pin 58. The pin 58 is provided with the legs 59 and 60, which are normally sprung apart, and each provided with an outer crimp 61 therein. The pin 58 is adapted for insertion in the bore 62 of the standard stem 12 of device B, and engages in a bulge 63 near the upper terminal of said stem. The opposite end 64 of the cable 55 depends downwardly into the inner casing 35, and is provided upon its depending end with a polygonal weight member 65, which is preferably red in color to form a sharp contrast with the frosted surface 38 of the said casing 35.

In operation, upon fall of the float 11 in the reservoir A, the stem 12 will fall with the float 11. The cable 55 through the connection by means of pin 58 with the stem 12, will be drawn through the tubular guide member 50. The weight 65 within the inner casing 35 will be drawn upwardly, said upward movement of said weight 65 being readily discernible through the forward transparent wall 37 of the inner casing 35. By means of the indicia 24 on the fin 23, the polygonal weight 65 will indicate the height of the oil within the reservoir A. It is an important feature of this invention, that the weight 65 be polygonal in formation, having flat surfaces facing the arcuate interior surface of the casing 35, whereby the sharp marginal edges of the polygonal weight 65 may contact the interior of the casing 35, without liability of damage thereto, since the weight 65 will be swung readily away when contacting with the inside of the casing.

From the foregoing description, it can be seen that an improved device has been perfected, for use with the standard equipment upon "Cadillac" cars, which will be of utmost utility, inasmuch as the oil level will be indicated or clearly conveyed to the driver of a vehicle, without recourse to the standard equipment B. It is a fact that negligence of vehicle drivers to disconnect and lift the engine hood to read the indicating mechanism B has resulted in bearings being burned out. However, with the improved gauge C, mounted upon the dash or instrument board D, conveniently in sight of the vehicle driver, there will be practically no liability of oil accidentally becoming too low in the reservoir.

Various changes in the shape, size and arrangement of parts may be made to the form of the invention herein shown and described, without departing from the spirit of the invention or the scope of the claims.

I claim:

1. The combination with a float having a hollow stem therefor, the stem being provided with internal recesses adjacent its upper end, of a casing mounted upon an instrument board remote from said float and having a transparent wall, a flexible cable, a pin carried by said cable for extending into the hollow stem of said float and having offset portions fitting into the recesses of the stem to connect the pin with the stem, and weighted means carried by said cable and disposed in the casing for stretching said cable taut and being visible through the transparent wall of the casing for indicating rise and fall of the float.

2. In a gauge, the combination with a float having a stem thereon, a casing open at one side, a tube detachably mounted in said casing and visible through the open side of said casing, said tube having a transparent forward portion and an opaque rear portion preventing complete visibility through the tube and concealing a portion of the casing, fasteners passing through the concealed portion of the casing for connecting the casing to an instrument board, a flexible cable operating within the last mentioned tube detachable means connecting said float stem and one end of said cable, and a weight on the other end of said cable extending into the tube for visibility through the open side of said casing, said weight adapted to rise and fall with said float for indicating purposes.

CHARLES P. NELSON.